Figure 1:
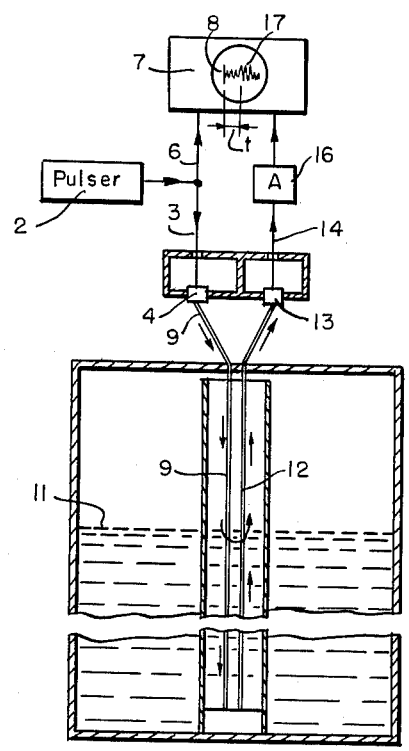

Dec. 14, 1965  H. P. KALMUS ET AL  3,222,929
AUGMENTED-SIGNAL MECHANICAL WAVE DEPTH GAUGE
Filed Sept. 21, 1964  2 Sheets-Sheet 1

INVENTORS
Henry P. Kalmus
Max L. Libman

BY  *Max L. Libman*
ATTORNEY

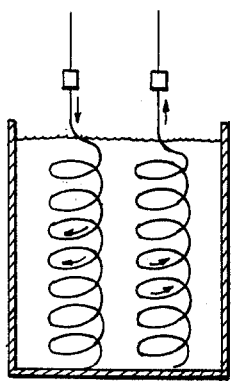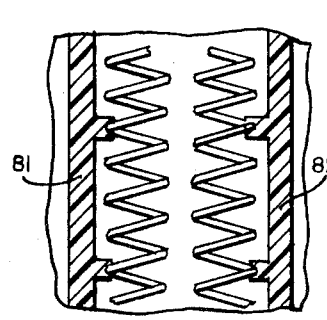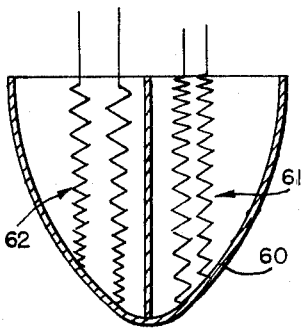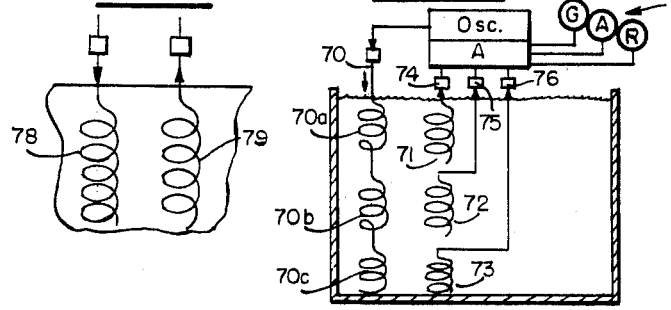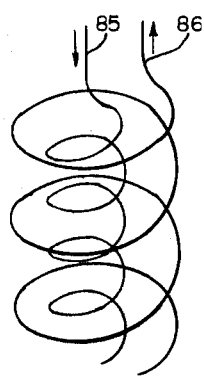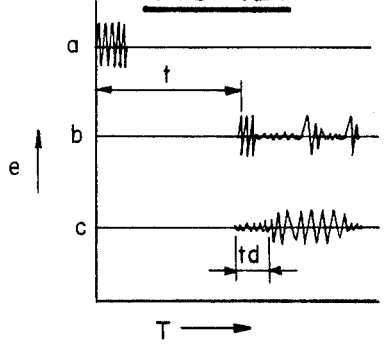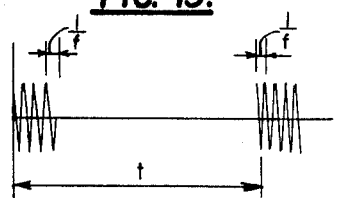

United States Patent Office    3,222,929
Patented Dec. 14, 1965

3,222,929
AUGMENTED-SIGNAL MECHANICAL WAVE
DEPTH GAUGE
Henry P. Kalmus, 3000 University Terrace NW., Washington 16, D.C., and Max L. Libman, Box 112, Rte. 5, Fairfax County, Va.
Filed Sept. 21, 1964, Ser. No. 398,003
9 Claims. (Cl. 73—290)

This invention relates to the measurement of liquid volume in a container, and more specifically to the determination of the depth of liquid in a closed container, and has for its primary object the provision of a system for remote indication of the liquid level in a tank.

Our copending patent application Ser. No. 359,800, filed April 14, 1964, discloses a liquid depth gauge utilizing two separate paths in the form of nonresonant metallic signal conductors, one for transmission of the mechanical impulses from a transducer to the surface of the fluid to be measured, and the other for separate transmission of mechanical impulses from the surface of the fluid to a second transducer, and utilizes a float at the surface of the liquid to provide a bridging path at the surface of the liquid between the two acoustic signal conductors. This has the disadvantage of requiring a mechanical element, namely the float, with consequent danger of either sticking or excessive wear. It is therefore highly desirable to eliminate the float. However, efforts to measure the liquid level by direct transmission through the liquid from one of the acoustic conductors or wires to the other, utilizing straight vertical wires, have been disappointing, in both the weakness and lack of sharp definition of the signals obtainable, which were not sufficient for most practical purposes or requirements.

It is a primary purpose of the present invention to overcome the above drawback, and to provide a separate-return-path depth indicator of the same general type as disclosed in our above prior application, but capable of producing an accurate, clearly defined signal indicative of the level of fluid in a closed vessel, without the use of any floating element or other mechanical moving part. This is accomplished according to the invention by providing an augmented signal corresponding to a given critical depth of fluid being measured, by exciting nonresonant longitudinal acoustic pulses in an elongated mechanical acoustic signal conductor such as a wire, and providing a second elongated acoustic conductor for receiving mechanical pulses from the first conductor through the liquid being measured at or near its surface, said conductors being so arranged that the signal corresponding to a given vertical depth below the surface of the fluid being measured, is greatly augmented. This augmentation may be provided in a simple case by passing the two conductors in proximity to each other through the liquid at a very large angle with the perpendicular, and in most cases, in a direction which is horizontal or nearly so. In this way, there is a considerable length of both transmitting conductor and receiving conductor for each vertical unit of depth, and the resulting signal corresponding to a given change in level is greatly augmented. As will be shown below, this effect is accomplished most effectively if certain definite relationships are maintained between the transmitting and receiving acoustic conductors or wires, and is particularly effective in a depth gauge, if the two wires are in the form of helices placed side by side.

Another object of the invention is to provide an improved spot-level detector, i.e., means for indicating whether the fluid is at a given level, i.e., completely full, half-full, or empty, as the case may be. This information is often all that is required, rather than a quantitative evaluation of the amount of fluid at any time in the tank. The invention provides a very simple and highly accurate method of making this evaluation without the use of any moving parts.

Figure 2:
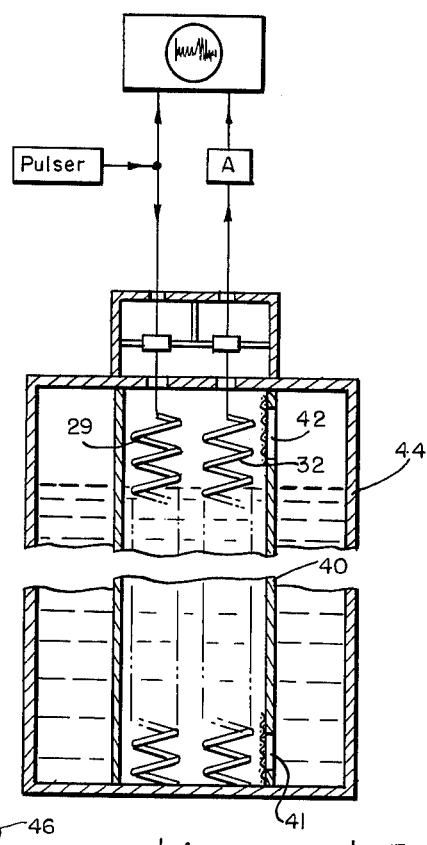

The specific nature of our invention as well as other objects and advantages thereof will clearly appear from a description of a preferred embodiment as shown in the accompanying drawings, in which:

FIG. 1 is a schematic drawing, partly in section, used in explaining the invention;
FIG. 2 is a schematic drawing, partly in section, showing a preferred form of the invention;
FIGS. 3, 4, 5 and 6 are schematic drawings used in explaining the principles of the invention;
FIG. 7 is a detail view showing how long sensing elements can be supported;
FIG. 8 shows the invention applied to nonuniform tanks;
FIGS. 9 and 10 show the invention applied to spot-level sensing;
FIG. 11 shows a modified form of the invention;
FIGS. 12 and 13 are timing diagrams explaining the operation of the invention.

Referring to FIG. 1, the simplest form of naive apparatus is shown, in which an electrical pulse produced by pulser 2 and transmitted on wire 3 to a transducer 4 which converts the electrical pulse into a mechanical pulse. At the same time a portion of the pulse from 2 is also transmitted on line 6 to oscilloscope 7 in order to produce the starting pulse 8 for timing purposes. Transducer 4 converts the electrical pulse to a mechanical pulse which now travels down acoustic conductor 9, which may be, for example, a metal wire of suitable material such as stainless steel or phosphor bronze. Wire 9 extends down into the liquid 11, the level of which is to be measured, and therefore the mechanical pulses travelling down this wire will be transmitted through the liquid near the surface, and back along a similar wire 12 which is connected to a similar transducer 13, where the mechanical pulse is now transformed into an electrical pulse on wire 14, and after suitable amplification in amplifier 16 is transmitted to the oscilloscope 7 to produce a second pulse 17, the distance between the initial pulse 8 and the second pulse 17 representing the time of travel $t$ of the mechanical pulse along the wires 9 and 12, and therefore providing an indication of the distance to the surface of the liquid, since the time required for the transmission of the electrical pulses in the electrical portion of the circuit is negligible.

While the above arrangement as shown in FIG. 1 is theoretically operative for the intended purpose, and in practice, with a very high degree of amplification and very close spacing of the wires, and so forth, some signal can be obtained, which may be useful in situations where high accuracy is not required, in practice, the signal transmitted through the liquid from wire 9 to wire 12 is very weak, and also is not a highly accurate indication of the position of the level, since most of the signal appears to come from various points considerably below the surface, depending apparently upon standing waves, reflections from the surface, and so forth. In practice, this naive arrangement has turned out to have very severe limitations as a depth measuring apparatus.

FIG. 2 shows the arrangement according to the invention, which is essentially somewhat that of FIG. 1, except that instead of straight wires 9 and 13, helical coils 29 and 32 are employed, preferably encased in a protective housing 40, which may be of tubular or oval cross section, and is provided with suitable apertures 41 and 42 at the bottom and top respectively for the admission of fluid, so that the level of liquid in the housing is the same as that in the tank 44. In practice, it has been found that the helical arrangement produces a greatly augmented signal as compared with the straight wires, and appears especially to give a very good indication of the distance to the surface, because the first return or burst of mechanical energy, corresponding to the shortest total length of travel along the wires 29 and 32 from emitting transducer 24 to receiving transducer 33, produces a very sharply defined and clear-cut signal which gives a very reliable indication of the liquid level. Certain factors which appear to account largely for the improved result have been observed, as will be explained below.

Figure 3:
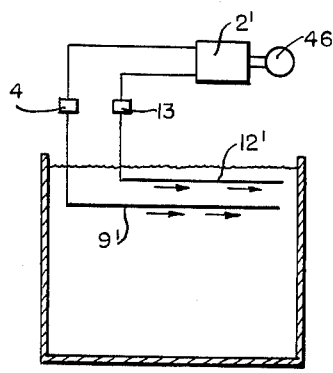

FIG. 3 shows essentially the apparatus of FIG. 1 with the two wires 9' and 12' extending in the horizontal direction rather than vertically, so that the presence of a return signal indicates the fact that there is a liquid bridging the space between the two wires; in other words, the arrangement of FIG. 3 may be considered as a spot level indicator for showing whether the liquid has reached the level corresponding to the vertical distance of these two wires from the bottom of the tank. In this case, of course, the timing of the return pulse is not important, but merely the fact that a return signal is obtained provides the desired indication. Hence, it is not necessary to use an oscilloscope, but instead the presence of a return signal in transducer 13 may be used to actuate, a signal lamp 46, the electrical apparatus housed in 2' comprising merely an oscillator circuit for producing pulse in transducer 4, together with the detecting and amplifying means responsive to a received signal from transducer 13. It will be apparent that the mechanical pulses produced by transducer 4 in wire 9' travel away from the transducer along the wire in the direction of the small arrows shown associated with wire 9'. These pulses excite the liquid and produce wave fronts travelling essentially in the same direction as the pulses. Hence, the pulses produced in wire 12 maintain this direction and travel as indicated by the arrows.

Due to the bridging action of the fluid, which transmits the mechanical pulses (although at a lower velocity of transmission) to the wire 12', corresponding pulses will be produced in wire 12, 12', but these will also be travelling in the direction of the small arrows associated with that wire, namely, in the same direction as the pulses in wire 1'. Some mechanical pulse energy is transmitted immediately back toward transducer 13, but most of the energy is reflected from the end of wire 12', and then transmitted back, with consequent high attenuation, so that the received signal turns out to be very weak and unreliable. However, if the direction of wire 12 is reversed with respect to wire 9, as shown at 9" and 12" in FIG. 2, then it will be seen that the pulses produced in wire 12' are now travelling in the direction of transducer 13, and in practice it has been found that with this arrangement much better signals are received at transducer 13 than with the arrangement of FIG. 3.

Figure 4:
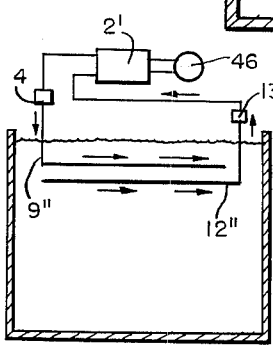
Figure 5:
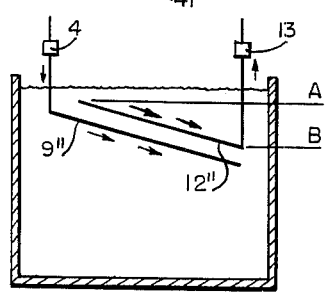

The arrangement of FIG. 4 is therefore suitable for use as a spot level indicator, but is still not useful as a quantitative depth gauge in the system of FIG. 1, because it will be apparent that the total time of travel will be the same regardless of the depth of liquid, even if the two wires are disposed vertically. Considering the arrangement of FIG. 5, wherein the wires are disposed at an angle, while quite strong signals can be obtained due to the greater length of wire between the levels A and B in the tank, it will be apparent that the time that it takes the signal to travel from transducer 4 to transducer 3 will not be affected by the point at which the liquid level is between points A and B, since the total distance of travel remains the same. However, if the two wires are arranged in helical form as shown in FIG. 2, and as indicated more schematically in FIG. 6, the effect is quite different as will now be explained. Seen from the top, the two helices are wound in the same sense. Energy transfer occurs chiefly between parts of the wire which are close together, and the arrows in FIG. 6 show the direction of the transmitted and received waves. It can be clearly seen that while the wave in acoustic conductor 29 is spiralling downwards, the wave in acoustic conductor 32 is spiralling upwards, i.e., its direction has been reversed.

FIG. 12a shows the transmitted pulse, consisting of a few waves at a frequency of, say, 100,000 cycles per second. In FIG. 12b the received pulse is shown as measured across the transducer conected to wire 32. Because the wave is immediately directed backwards after entering the liquid surface, the initial 100 kc. waves are well defined so that the transmittance can be defined with high accuracy. In FIG. 12c, the conditions are shown if the helices are wound in opposite sense. The return pulse is directed away from the transducer so that it appears badly defined with additional ill defined delay time $td$ which depends on reflections after the transmitted energy has impinged on wire 32.

Another advantage of the helix as compared with a simple sound guide is the use of a lower carrier frequency to achieve the same definition. In FIG. 13, the transmitted and received pulses are shown. The transit time is $t=2D/C$, where D is the distance from the transducers to the liquid level. Let $f$ be the carrier frequency. If at least four waves are required for a reading, the minimum transit time-increment which can be determined is:

$$\Delta t = 4 \cdot 1/f$$

Hence, the carrier frequency necessary for this accuracy is:

$$f = 2c/d$$

Now, for $d=.01$ foot, and for simple wires as sound guides:

$c=15{,}000$ feet per second;

$$f = \frac{2 \cdot 15{,}000}{1/100} = 3 \text{ mc.}$$

If, however, a helix is employed wound in such a way that 20 times as much wire is employed to cover the same vertical distance, $c = 1/20 \cdot 15{,}000$ feet per second;

$$f = \frac{2 \cdot 1/20 \cdot 15{,}000}{1/100} = 150 \text{ kc.}$$

In other words, there is twenty times as much length of wire in the same vertical distance, and hence each pulse travelling along the wire traverses only 1/20th of the vertical distance that it would in the case of a straight wire. The ratio of 20 to 1 is given by way of example, as this ratio is not critical, but the horizontal component of length of the wire should preferably be greater than the vertical length, i.e., the wire should make an angle of less than 45° with the horizontal.

The use of this lower carrier frequency makes it possible to employ less expensive and more efficient transducers. In addition, cheaper transistors can be used in the amplifiers.

Another advantage of the helical construction is that by making the pitch of the helix nonuniform, it becomes possible to obtain a linear function between level reading and liquid volume even if the cross-sectional area of the vessel is nonuniform over the depth of the vessel. For example, as shown in FIG. 8, a ship's tank 60 is often of nonuniform cross section in order to accommodate itself to the shape of the ship. In this case, the tank is shown as having a smaller cross section toward the bottom than at the top. A linear depth indication would therefore not correspond accurately to the volume of liquid contained by the tank at any given depth; however, by increasing the pitch of helices 61 between adjacent turns toward the bottom of the tank, this effect can be compensated for, so that successive time intervals of travel along the helix of sound pulses will correspond to successively equal increments of contained liquid. This enables the use of linear scale direct reading instruments, which may be of the type shown in our prior application Serial No. 359,800 previously referred to. Alternatively, the diameter of the helical turns can be increased or decreased to provide, as at 62, the necessary compensation, or a combination of the two may be used.

One limitation of the helical coils lies in the fact that many more times more wire is required for a given linear length of tank depth than in the case of straight wires, hence the attenuation of the sound impulse along the wire, which is also a factor of the total length of wire involved, becomes a limiting factor. For example, in a given size of wire actualy employed, the attenuation of the pulse was found to be 6 db per 15 feet of wire. With a practical sound transducer and electrical energizing circuit, a usable signal can be obtained through about 800 feet of such wire. With a turn diameter of about 1.5 inches, and a spacing of about three turns per inch, a useful signal can readily be obtained for a tank depth of about 10–15 feet. Of course, greater depth can be measured by using more powerful transducers and signal generating equipment; however, the cost of such equipment becomes a factor as the size is increased.

As previously pointed out, the arrangement of FIGS. 3 and 4 can be used as a spot level indicator. However, this requires an undesirable linear length of wire in most practical situations. FIG. 9 shows how a spot indicator can be made by employing instead two helices 78, 79, similar to those shown in FIG. 2, except that each helix contains only three or four turns, so that the helix pair can now be used as a spot level indicator. In this case, it is of course not necessary to measure the transit time as in the case of the continuous level indicator, since the only information which it is necessary to have is that there is some appreciable transfer of energy from the sending to the receiving coil. Hence, a much simpler circuit can be used, since it is necessary only to actuate some indicator which will show that the desired level has or has not been reached. A modification of this arrangement is shown in FIG. 10, where the transmitting wire 70 consists of three helices 70a, 70b, and 70c serially connected, which can be energized by a single transducer. Three receiving helices 71, 72, and 73, are arranged opposite the three primary helices, and each is connected to a separate transducer 74, 75 and 76 respectively, to produce an electrical circuit in each case, which after suitable amplification may, for example, actuate suitable visual indicators 77 such as green, amber and red lights to show that the tank is full, half-full (or nearly empty), and empty respectively.

FIG. 11 shows an alternative arrangement in which the two helices 85, 86 are arranged concentrically, with one inside of the other. In this case, the helices should be wound with opposite pitch in order to secure the correct directional effect as explained above. FIG. 7 shows one way of supporting the helices which is useful for measuring deep tanks, where the total length of the helix required is such that the weight of the helix tends to expand the turns on the upper portion more than those at the bottom. It is therefore helpful to support the two helices along their length, which may be done by an arrangement of such members 81 and 82, which are preferably of a material making a poor acoustic match with the metal of the helices, e.g., plastic material, so as to minimize the loss of energy at the points of support. It will be noted that the two supporting members 81 and 82 are also isolated from each other as much as possible to minimize the transfer of energy between the helices through the material of the supports.

It will be apparent that the helices may be of other shapes, providing they serve the general purpose of concentrating a considerable longitudinal length of the sound conductive material into a small vertical length, so as to concentrate energy with respect to variation in depth. For example, the helices may be oval instead of round, or an extreme case may even be of a zig-zag configuration, or, for spot level indicators, a spiral configuration may be employed.

It will be apparent that the embodiments shown are only exemplary and that various modifications can be made in construction and arrangement within the scope of our invention as defined in the appended claims.

We claim:
1. Means for measuring the distance of a liquid level from a reference plane above the liquid comprising
 (a) first and second elongated sonic pulse transmitting elements extending from above the liquid into the liquid,
 (b) means for transmitting mechanical pulses from a point above the highest liquid level to be measured along said first element in one direction and into the liquid,
 (c) at least a portion of said first element in the liquid being inclined at an angle less than 45 degrees with the plane of the liquid surface,
 (d) a portion of said second elongated element being adjacent said inclined portion in said liquid and being also inclined at an angle of less than 45 degrees to the surface,
 (e) transducer means responsive to pulses received through the liquid, from said first element to said second element, and along said second element, and for converting said pulses into a signal indicative of the depth of the liquid.

2. The invention according to claim 1,
 (a) said transducer means being means for producing an electrical pulse indicative of the time of arrival of said received pulses, said transducer means being at the end of said second element toward which the received pulses are travelling,
 (b) means for measuring the time interval between the transmitted pulses and said resulting received pulses as an indication of the liquid level.

3. Liquid level indicating means comprising
 (a) first and second elongated sonic pulse transmitting elements extending into the liquid,
 (b) means for transmitting mechanical pulses along said first element in one direction and into the liquid,
 (c) a substantial portion of said first element being displaced in the liquid at such an angle that a pulse transmitted along the electrode travels a substantial horizontal distance while traversing said portion, and produces a corresponding wave front in the liquid having a substantial horizontal component of motion,
 (d) a portion of said second element being adjacent said substantial portion of the first element and at least generally parallel thereto, whereby said moving wave front of the liquid produces a pulse in said second element moving in the same general direction as said wave front,
 (e) transducer means at the end of said second element toward which said pulses are moving, for converting said pulses to electric pulses indicative of the depth of the liquid.

4. The invention according to claim 3, said first and second elements being wires of good mechanical pulse-transmitting material, at least a portion of the wire of each element being in the form of a helix in the liquid being measured, the two helices being generally parallel.

5. The invention according to claim 4, the two helices extending continuously from the highest level of the liquid to the bottom of the liquid.

6. The invention according to claim 4, said two helices being in spaced side-by-side relation, with their turns wound in the same sense.

7. The invention according to claim 3, at least one of said elements extending vertically through a restricted depth, but extending horizontally through a greater distance in the liquid than the extent of said depth, for indicating when the liquid has reached the locus of said restricted depth, by transmitting pulses from said first element to said second element through the liquid.

8. The invention according to claim 3, said first element extending vertically through a major portion of the depth to be measured; a plurality of short helical second elements adjacent said first element at different depths, and a transducer associated with each of said plurality of second elements for producing electrical pulses indicating when the depth of the liquid has reached the respective second elements, and signal means associated with each of said transducers.

9. The invention according to claim 3, said means for transmitting pulses comprising means for producing pulse bursts of mechanical waves in said first sonic pulse transmitting element, each such pulse burst comprising a train of mechanical pulses at sonic or supersonic frequency.

References Cited by the Examiner

UNITED STATES PATENTS

| | | | |
|---|---|---|---|
| 3,080,752 | 3/1963 | Rich | 73—290 |
| 3,110,890 | 11/1963 | Westcott | 73—290 |
| 3,113,456 | 12/1963 | Smith | 73—290 |
| 3,133,442 | 5/1964 | Werner | 73—290 |
| 3,184,968 | 5/1965 | Werner | 73—290 |

FOREIGN PATENTS 809,681  3/1959  Great Britain.

LOUIS R. PRINCE, *Primary Examiner.*

FRANK H. THOMSON, *Assistant Examiner.*